(12) United States Patent
VanLund et al.

(10) Patent No.: US 11,574,621 B1
(45) Date of Patent: Feb. 7, 2023

(54) STATELESS THIRD PARTY INTERACTIONS

(71) Applicant: Amazon Technologies, Inc., Seattle, WA (US)

(72) Inventors: Peter Spalding VanLund, Seattle, WA (US); Nicolas Anton Medhurst Hertl, Seattle, WA (US); Peter Paul Henri Carbon, Bellevue, WA (US); Vikram Kumar Gundeti, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 16/734,185

(22) Filed: Jan. 3, 2020

Related U.S. Application Data

(63) Continuation of application No. 14/581,608, filed on Dec. 23, 2014, now abandoned.

(51) Int. Cl.
  *G10L 13/00* (2006.01)
  *G10L 15/22* (2006.01)
  *G10L 15/26* (2006.01)

(52) U.S. Cl.
  CPC .............. *G10L 13/00* (2013.01); *G10L 15/22* (2013.01); *G10L 15/26* (2013.01)

(58) Field of Classification Search
  CPC .......... G10L 13/00; G10L 15/22; G10L 15/26
  See application file for complete search history.

(56) References Cited

U.S. PATENT DOCUMENTS

| | | | |
|---|---|---|---|
| 5,961,601 A | * | 10/1999 | Iyengar ................... H04L 29/06 709/228 |
| 6,035,334 A | | 3/2000 | Martin et al. |
| 8,761,737 B2 | | 6/2014 | Clarke et al. |
| (Continued) | | | |

FOREIGN PATENT DOCUMENTS

| | | | | |
|---|---|---|---|---|
| EP | 1457892 A1 | * | 9/2004 | ....... G06F 17/30902 |
| JP | 2005518041 A | * | 6/2005 | ............. G06F 21/10 |
| (Continued) | | | | |

OTHER PUBLICATIONS

Young, Steve, et al. "Pomdp-based statistical spoken dialog systems: A review." Proceedings of the IEEE 101.5 (2013): 1160-1179. (Year: 2013).*

(Continued)

*Primary Examiner* — Daniel C Washburn
*Assistant Examiner* — Oluwadamilola M Ogunbiyi
(74) *Attorney, Agent, or Firm* — Lee & Hayes, P.C.

(57) ABSTRACT

A system for enabling end user devices to access third party cloud-based resources. For example, the system may include a first party cloud-based resource for converting sound into a format accessible to the third party cloud-based resource, storing and/or maintaining state information related to the an open communication session between the end user device and the third party cloud-based resources, and converting text-based audio announcements into audio that may be output by the end user device. In some cases, the first party cloud-based resource may transmit user responses together with stored state information to the third party cloud-based resources in a manner that the third part cloud-based resources may treat each interaction with the end user as a separate communication session.

20 Claims, 7 Drawing Sheets

(56) References Cited

U.S. PATENT DOCUMENTS

| | | | | |
|---|---|---|---|---|
| 2002/0166000 A1* | 11/2002 | Rossi | ................... | G06F 9/4843 |
| | | | | 718/107 |
| 2003/0064716 A1* | 4/2003 | Gailey | ................... | H04W 4/16 |
| | | | | 455/414.1 |
| 2003/0187800 A1* | 10/2003 | Moore | ................. | H04M 15/55 |
| | | | | 379/114.03 |
| 2004/0003041 A1 | 1/2004 | Moore et al. | | |
| 2004/0030750 A1* | 2/2004 | Moore | ................. | H04M 15/08 |
| | | | | 709/204 |
| 2004/0103261 A1* | 5/2004 | Honda | ................. | G06F 3/0665 |
| | | | | 711/202 |
| 2004/0193424 A1* | 9/2004 | Dames | ............... | H04M 3/4938 |
| | | | | 704/270.1 |
| 2005/0015491 A1* | 1/2005 | Koeppel | .............. | H04L 67/142 |
| | | | | 709/225 |
| 2005/0234710 A1* | 10/2005 | Falcon | ................... | G10L 15/22 |
| | | | | 704/200 |
| 2006/0143007 A1* | 6/2006 | Koh | ........................ | G10L 15/22 |
| | | | | 704/243 |
| 2007/0005603 A1* | 1/2007 | Jain | ..................... | G06F 16/1774 |
| 2007/0291757 A1* | 12/2007 | Dobson | ................... | H04L 43/50 |
| | | | | 370/392 |
| 2008/0005331 A1* | 1/2008 | Shiraishi | ............ | H04N 1/00954 |
| | | | | 709/226 |
| 2010/0067549 A1* | 3/2010 | Nomura | ................... | H04L 43/00 |
| | | | | 370/474 |
| 2010/0124325 A1* | 5/2010 | Weng | ...................... | G10L 15/22 |
| | | | | 704/251 |
| 2010/0318999 A1 | 12/2010 | Zhao et al. | | |
| 2010/0325485 A1* | 12/2010 | Kamath | ................... | H04L 69/40 |
| | | | | 714/15 |
| 2011/0072466 A1* | 3/2011 | Basso | ...................... | G06F 16/73 |
| | | | | 725/47 |
| 2011/0176537 A1 | 7/2011 | Lawson et al. | | |
| 2011/0231478 A1 | 9/2011 | Wheeler et al. | | |
| 2011/0265174 A1 | 10/2011 | Thornton et al. | | |
| 2012/0159235 A1* | 6/2012 | Suganthi | ............ | G06F 11/2048 |
| | | | | 714/E11.073 |
| 2012/0232886 A1* | 9/2012 | Capuozzo | ........... | H04L 12/2814 |
| | | | | 704/9 |
| 2013/0007499 A1 | 1/2013 | Moy | | |
| 2013/0198296 A1 | 8/2013 | Roy et al. | | |
| 2013/0268655 A1 | 10/2013 | Luna et al. | | |
| 2013/0311594 A1 | 11/2013 | Luna et al. | | |
| 2014/0025383 A1* | 1/2014 | Dai | ........................ | G10L 25/63 |
| | | | | 704/260 |
| 2014/0058724 A1 | 2/2014 | Barve et al. | | |
| 2014/0123008 A1* | 5/2014 | Goldstein | ............ | H04R 1/1016 |
| | | | | 715/716 |
| 2014/0136195 A1 | 5/2014 | Abdossalami et al. | | |
| 2014/0286358 A1 | 9/2014 | Mahvi | | |
| 2014/0379326 A1* | 12/2014 | Sarikaya | ................. | G06F 40/40 |
| | | | | 704/9 |
| 2014/0379353 A1 | 12/2014 | Boies et al. | | |
| 2015/0139508 A1* | 5/2015 | Ye | .......................... | G06V 40/70 |
| | | | | 382/116 |
| 2015/0248884 A1* | 9/2015 | Ljolje | ..................... | G10L 15/07 |
| | | | | 704/243 |
| 2015/0271295 A1 | 9/2015 | Mahoney et al. | | |
| 2015/0331666 A1* | 11/2015 | Bucsa | ..................... | G10L 15/22 |
| | | | | 704/275 |
| 2015/0363393 A1 | 12/2015 | Williams et al. | | |
| 2016/0057031 A1 | 2/2016 | Gedam | | |
| 2016/0132046 A1 | 5/2016 | Beoughter et al. | | |
| 2017/0163675 A1 | 6/2017 | Warman et al. | | |
| 2017/0214534 A1* | 7/2017 | Rivas Molina | ......... | H04W 4/16 |
| 2018/0293834 A1 | 10/2018 | Cage et al. | | |
| 2019/0265851 A1 | 8/2019 | Andersson et al. | | |

FOREIGN PATENT DOCUMENTS

| | | | | | |
|---|---|---|---|---|---|
| JP | | 2009015875 A | * | 1/2009 | ............. G06F 21/10 |
| KR | | 20070007760 A | * | 1/2007 | ............. G10L 15/10 |
| TW | | 200828926 A | * | 7/2008 | ............. G06F 21/10 |
| WO | WO-2005038775 A1 | | * | 4/2005 | ............. G10L 15/22 |
| WO | WO2012145466 A1 | | | 10/2012 | |

OTHER PUBLICATIONS

Office Action for U.S. Appl. No. 14/581,608, dated Oct. 3, 2019, VanLund et al., "Stateless Third Party Interactions", 28 pages.

Office Action for U.S. Appl. No. 14/581,608, dated Oct. 5, 2017, VanLund et al., "Stateless Third Party Interactions", 22 pages.

Office Action for U.S. Appl. No. 14/581,608, dated Mar. 22, 2017, VanLund et al., "Stateless Third Party Interactions", 18 pages.

Office Action for U.S. Appl. No. 14/581,608, dated Apr. 5, 2019, VanLund et al., "Stateless Third Party Interactions", 29 pages.

Office Action for U.S. Appl. No. 14/581,608, dated Aug. 12, 2016, VanLund et al., "Stateless Third Party Interactions", 17 pages.

Office Action for U.S. Appl. No. 14/581,608, dated Aug. 2, 2018, VanLund et al., "Stateless Third Party Interactions", 25 pages.

* cited by examiner

STATELESS THIRD PARTY INTERACTIONS

CROSS-REFERENCE TO RELATED APPLICATIONS

This application is a continuation of, and claims priority to, co-pending, commonly-owned U.S. patent application Ser. No. 14/581,608 filed on Dec. 23, 2014, which is incorporated herein in its entirety by reference.

BACKGROUND

The use of whole home surround sound and ubiquitous computing devices is becoming more and more common. Many new homes and offices are built fully wired, while many old homes and offices utilize various wireless systems. Many different ways have been introduced to allow users to interact with computing devices, such as through mechanical devices (e.g., keyboards, mice, etc.), touch screens, motion, gesture, and even through natural language input such as speech. Furthermore, many of these devices are further connected to remote computing resources, such as cloud-based resources, that extend functionality afforded by the local devices.

As computing devices in homes and offices continue to evolve, users expect a more seamless and timely experience when interacting with cloud-based resources through local devices. Additionally, users expect a more robust set of services when interacting with cloud-based resources through local devices. In particular, users expect access to a variety of third party cloud-based resources without significant lag time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
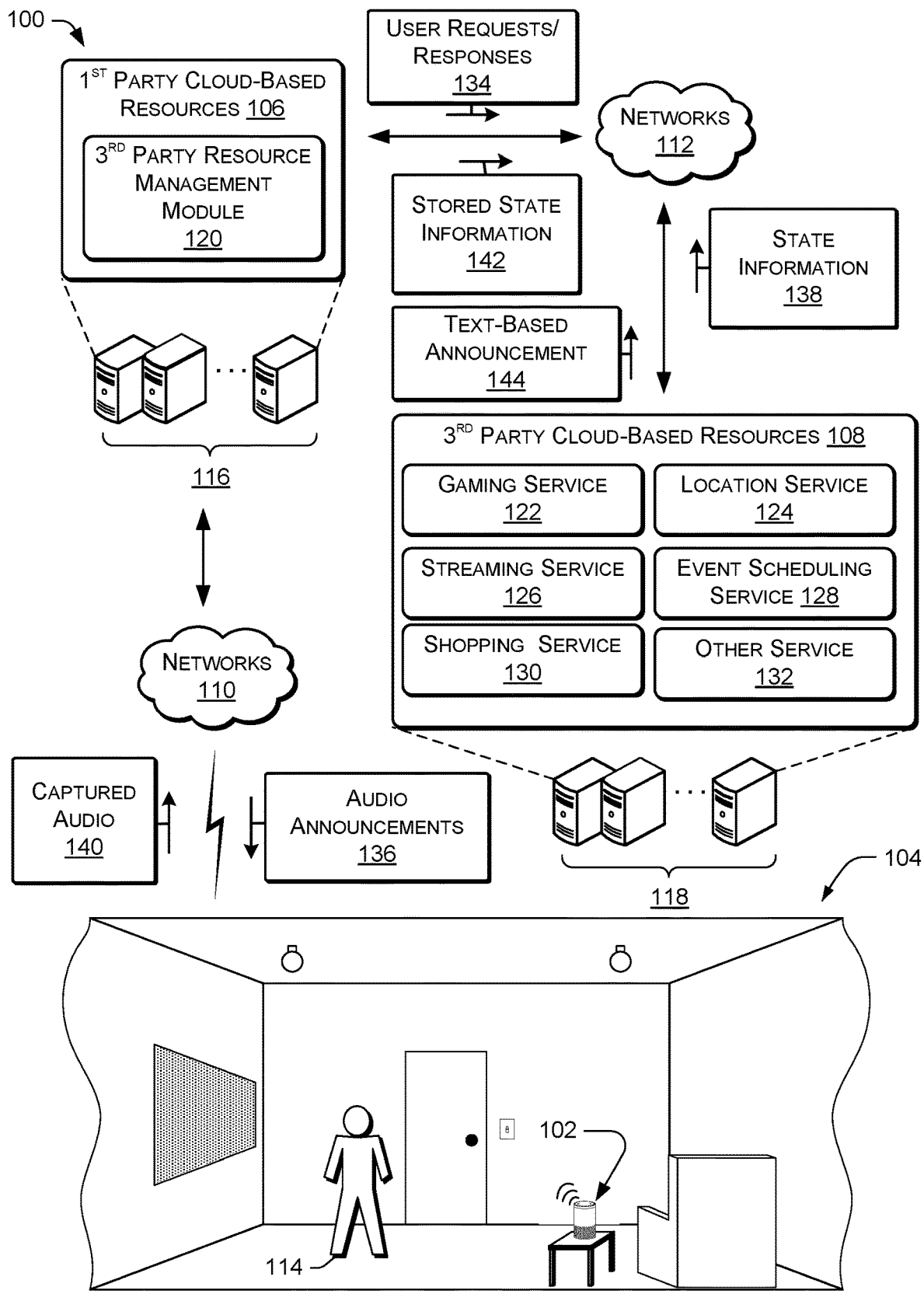
FIG. 1 illustrates an example home environment including a device physically situated in the home, but communicatively coupled to remote first party cloud-based resources and third party cloud-based resources accessible via one or more networks.

This disclosure includes techniques and implementations to improve performance of home and office computing systems when interacting with cloud-based resources. In particular, this disclosure describes ways to improve user experience when accessing cloud-based content offered by the cloud-based resources. For instance, a system may be configured to allow users to access cloud-based resources or content via a device physically situated in the home or office of the user. In some cases, the device may be configured to access the remote resources to perform database searches, locate and consume/stream other forms of entertainment (e.g., games, movies, electronic books, etc.), aid in personal management tasks (e.g., calendaring events, taking notes, etc.), assisting in online shopping, conducting financial transactions, and so forth.

In one example, the cloud-based resources accessible by the device may be non-downloadable software operating on first party cloud-based resources (e.g., resources for services made available by the device provider), as well as non-downloadable software operating on third party cloud-based resources (e.g., resources for services made available by a third party but accessible by users of the device). In this example, the device may be configured to relay user responses (such as spoken or verbal commands, requests, and responses) to the first party cloud-based resources and to output audio announcements received from the first party cloud-based resources regardless as to whether the user responses are directed to a first party cloud-based resource or a third party cloud-based resource.

For instance, in some implementations described herein, a user may request access to a particular third party cloud-based resource by speaking the phrase "please access car rental service". In some cases, the user may request specific car rental services, while in other cases the user may defer to selections by other sources/systems such as the device, the first party cloud-based resources, and/or the third party cloud-based resources. In this instance, the device may capture the spoken phrase via one or more microphones and relay the captured audio to the first party cloud-based resources. The first party cloud-based resource may analyze the captured audio and identify the request to access the car rental service. The first party cloud-based resource may then select or identify an appropriate third party cloud-based resource and cause the third party cloud-based resource to initiate an instance or access as part of an overall communication session corresponding to the user or the user's account. In some cases, the instance or access may be a temporary communication which may be opened and closed for each interaction included in the overall communication or communication session between the user and the third party cloud-based resource. For example, the instance may include providing an announcement from a third party cloud-based resource to an end user device and the user response thereto. Thus, a communication session may be formed from multiple instances or interactions between the third party cloud-based resources and the user. In some cases, within a single communication session multiple interactions may occur between the user and the third party cloud-based resource. For example, the user may request a rental car from the third party cloud-based resource. The rental car service may respond by asking where the user would like to pick up the car. The user may reply with a location. The rental car service may ask the user which type of car (e.g., compact, economy, mid-size, full-size, etc.). The user may select a full-size car. The rental car service may request pick up date and drop off date. The user may send the dates. The rental car service may provide prices. The user may respond with an order to reserve or rent the full-size car. In some cases, additional information or exchanges may be made between the user and the third party cloud-based resource. For example, payment information may be provided to the third party cloud-based resource.

During the exchange describe above, the device and/or the first party cloud-based resources may be configured to relay the user responses to the third party cloud-based resources and the announcements generated by the third party cloud-based resources to the user device. Since, each of the interactions associated with the instance or access are relayed through the first party cloud-based resources, some state information related to the instance or access may be maintained by both the first party cloud-based resources and the third party cloud-based resource. However, by designing a system in which the third party cloud-based resources maintain the state information, the lag time may be increased particularly when comparing interactions with first party cloud-based resources (e.g., an email application hosted by the first party cloud-based resources), as both the first party cloud-based resources and the third party cloud-based resources may have to identify the instance or access that each user request is associated with. In other cases, the performance may be reduced as each instance or access may be implemented on a single server hosted by the third party cloud-based resources causing the third party cloud-based resources or wait if another operation is being performed by the particular server.

Therefore, in some implementations described herein, the first party cloud-based resources may be configured to maintain a third party resource management module for routing and maintaining data associated with an instance or an access between third party cloud-based resources. For example, the third party resource management module may be configured to relay user responses and state information associated with the instance or access to and from the third party cloud-based resource, such that each user response may be processed by the third party cloud-based resource as a separate instance or access. In this manner, the difficultly in designing third parties resources, services, or application for use with the system described herein is reduced and, in some cases, the overall processing and lag time may be reduced.

For instance, in an example instance or access, the user may request access to the car rental service by speaking the phrase "please access car rental service" near a device associated with the system, as described above. The device may capture the audio and relay the captured audio to the first party cloud-based resources. As discussed above, the first party cloud-based resource analyzes the captured audio to identify a user request. The third party resource management module may select an appropriate third party cloud-based rescue to handle the user request based on, for example, the type of user request, the data within the user request, information known about the user initiating the user request, information know about the account of the user initiating the user request, information known about various third party cloud-based resources, among others. The third party resource management module then either sends the captured audio or the user request to the selected third party cloud-based resource.

The third party cloud-based resource may process the user request and in return provide an announcement (e.g., information or requests for information to be sent to the user) and state information or other data back to the third party resource management module. In some cases, the third party cloud-based resource may close the instance or access at this point. However, the third party resource management module may store the state information as data related to the particular user, data related to with the device associated with the user, data related to with an account associated with the user, or data related to an access associated with the particular user, user account, or user device. The third party resource management module also provides the announcement to the device for output as sound to the user. For example, the third party cloud-based resource may send a text-based announcement to the first party cloud-based resources that is converted into an audio announcement that may be output by the device.

In this instance, the device may send a user response (e.g., in the form of captured audio) to the audio announcement to the first party cloud-based resources. The first party cloud-based resources may again analyze the captured audio to identify the user response. The third party resource management module may then associated or recognize the relationship between the user response and the stored state information (e.g., based on, for example, the device identifier, an open user account associated with the device, a user identified from the captured audio, etc.). The third party resource management module may send both the stored state information and the user response to the third party cloud-based resource. The third party cloud-based resource may process the user response as an independent access or interaction by relying on the state information received to send the context and background data associated with the user response.

For example, suppose the user response is a selection of a particular full-sized car that the user desires to rent. The third party resource management module may send the selection of the particular full-sized car together with state information representative of past interactions of a particular access between the third party cloud-based resource and the user to the third party cloud-based resource. In this example, the state information may include a pick up date and/or drop off date previously selected by the user, a price quoted by the third party cloud-based resource, pick up location previously selected by the user, or other information previously presented to the user or received from the user and associated with the access. In this manner, the third party cloud-based resource may collect the information necessary to complete a transaction over multiple interactions without maintain an open instance or access. Thus, the third party cloud-based resource may treat each interaction with the third party resource management module as an independent access or instance, thereby reducing user perceived lag time.

In some implementations, the state information may be a log maintained by the first party cloud-based resources. For example, each time a particular third party cloud-based resource sends state information associated with a particular interaction or user, the third party resource management module may append the received state information onto the stored state information. In this manner, each time the third party resource management module sends a user response to the particular third party cloud-based resource, the particular third party cloud-based resource receives the entire log or state information associated with each individual interaction corresponding to the instance or access.

In other implementations, the particular third party cloud-based resource may be configured to sends updates or replacement state information as part of each interaction. In this implementation, the first party cloud-based resources may be configured to replace the existing state information associated with the instance or access with the updated state information received from the third party cloud-based resource. In this manner, the third party cloud-based resource is able to manage the data represented by the state information and, in some cases, the amount of data transferred between the first party cloud-based resources and the third party cloud-based resource may be reduced.

FIG. 1 illustrates an example home environment 100 including a device 102 physically situated in the home 104, but communicatively coupled to remote first party cloud-based resources 106 and third party cloud-based resources 108 accessible via one or more networks 110 and 112. In the illustrated implementation, the device 102 is positioned on a table within the home 104. In other implementations, it may be placed in any number of places (e.g., an office, store, public place, etc.) or locations (e.g., ceiling, wall, in a lamp, beneath a table, under a chair, etc.). Further, more than one device 102 may be positioned in a single room, or one device 102 may be used to accommodate user interactions from more than one room of the home. In one particular example, the device 102 may be configured to communicate with other home electronic devices to capture environmental noise and perform user requested actions.

The device 102 may be communicatively coupled to the networks 110 via wired technologies (e.g., wires, Universal Serial Bus (USB), fiber optic cable, etc.), wireless technologies (e.g., Radio Frequency, cellular, satellite, Bluetooth®, etc.), or other connection technologies. The networks 110 and 112 are representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The networks 110 and 112 carry data, such as audio data, between the device 102, the first party cloud-based resources 108, and/or the third party cloud-based resources 108. In some cases, the networks 110 and 112 may be the same.

In the illustrated example, the device 102 is configured to conduct other transactions with the first party cloud-based resources 106 and to output audio or other content to a user 114 located in the home 104. In one particular implementation, the device 102 is configured as a voice controlled assistant that is primarily an audio-based device, receiving verbal instructions from the user 114 and outputting audio responses thereto. Thus, the device 102 may be equipped with one or more microphones and speakers, and has computing resources to process audio inputs. One particular implementation is described below in more detail with reference to FIG. 3.

In some implementations, the device 102 may be configured to access services or application hosted by the first party cloud-based resources 106 and the third party cloud-based resources 108 to perform database searches, locate and consume/stream other forms of entertainment (e.g., games, movies, electronic books, etc.), aid in personal management tasks (e.g., calendaring events, taking notes, etc.), assisting in online shopping, conducting financial transactions, and so forth. In some instances, the device 102 is implemented without a haptic input component (e.g., keyboard, keypad, touch screen, joystick, control buttons, etc.) or a display. In other instances, a limited set of one or more haptic input components may be employed (e.g., a dedicated button to initiate a configuration, power on/off, etc.).

The first party cloud-based resources 106 generally refer to a network accessible platform implemented as a computing infrastructure of processors, storage, software, data access, and so forth that is maintained and accessible via a network such as the Internet. The first party cloud-based resources 106 may not require end-user knowledge of the physical location and configuration of the system that delivers the services. Common expressions associated with cloud services include "on-demand computing," "software as a service (SaaS)," "platform computing," "network accessible platform" and so forth. In some cases, the first party cloud-based resources 106 may be implemented on one or more servers 116 remote to the home 104 and arranged in any number of ways, such as server farms, stacks, and the like that are commonly used in data centers.

The third party cloud based recourses 108 may also generally refer to network accessible platforms or services implemented as a computing infrastructure of processors, storage, software, data access, and so forth that may not require end-user knowledge of the physical location and configuration of the system that delivers the services. In general, the third patty cloud based recourses 108 represent various third party services and applications available to the user 114 located in the home 104 in addition to the applications and services sent by the first party cloud-based resources 106. In some cases, the third party cloud-based resources 108 may also be implemented on one or more servers 118 remote to the home 104 and arranged in any number of ways, such as server farms, stacks, and the like that are commonly used in data centers.

In some cases, the servers 116 may implement or host a third party resource management module 120 for facilitating user access to the third party cloud-based resources 108, as one of the first party cloud-based resources 106. In some implementations, the third party resource management module 120 may be configured to select third party cloud-based resources 108 for processing user requests, relaying user requests and state information to and from the third party cloud-based resources 108.

The third party cloud-based resources 108 may include any number of cloud-based services, applications, and/or resources implemented on the servers 118. For instance, in the illustrated example, the third party cloud-based resources 108 includes a gaming service 122, a location service 124, a shopping service 126, an event scheduling service 128, a streaming service 130, among other services 132. In some cases, the number and type of the third party cloud-based resources 108 available to the user 114 via the third party resources management module 120 may be a subset of the total number or types of third party cloud-based resources 108 accessible by the first party cloud-based resources 106. For example, the third party resources management module 120 may cause the servers 116 to maintain user data or account data associated with the user 114. In some instances, the user data or account data may include a list or log of third party cloud-based resources 108 that the user 114 has subscribed to, opted in to, selected, or authorized. In some cases, the third party resource management module 120 may also maintain a preference list or user rating associated with each of the third party cloud-based resources 108. In other instances, the user 114 may purchase the right to access or an account with each of the third party cloud-based resources 108 before a particular service becomes available to the user 114.

In general, the user 114 issues a user request 134 to open a communication session with a particular third party cloud-based resource 108, such as shopping service 130. The request 134 is received by the third party resource management module 120 and relayed to the shopping service 130. In turn, the shopping service 130 may send a text-based announcement 144 to output to the user 114 and state information 138 associated with the first instance of the communication session to be stored by the third party resource management module 120 to the third party resource management module 120. In some cases, the state information 138 may include a counter corresponding to the number of the instances or interaction associated with the communication session, user accesses associated with the user request 134, or an unique identifier the shopping service 130 may utilize to recognize additional user requests 134 as related to each other. The text-based announcement 144 may be data that the shopping service 130 intends to be converted to an audio announcement 136 via a text-to-speech protocol implemented on the device 102, as one of the first party cloud-based resources 108, or any other resource.

The third party resource management module 120 may send the audio announcement 136 (or in some cases the text-based announcement 144) to the device 102 for output as sound to the user 114 and store the state information 138 as data associated with the current instance between the user 114 and the shopping service 130. In some cases, the state information 138 may be stored as part of an account associated with user 114 (e.g., based on a user identifier or user account number), as data associated with the device 102 (e.g., based on a device identifier), as data associated with the home 104 (e.g., based on a home identifier), as data associated with a particular access or instance identifier, among others.

In some examples, the third party resource management module 120 may assign the device 102 to the access such that the third party resource management module 120 continuously sends the text-based announcements 136 received from the shopping service 130 to the device 102 as the audio announcements 136. In other examples, the third party resource management module 120 may assign the home 104 or an account associated with the home 104 to the access such that the third party resource management module 120 sends the audio announcements 136 to one or more devices associated with the home or the home account, for example, based on a known or detected location of the user 114 within the home 104. For instance, in this example, if the user 114 moves from the living room to the kitchen the third party resource management module 120 may deliver the audio announcement 136 to a second device located in the kitchen rather than the device 102 in the living room.

In this example, the audio announcement 136 output the device 102 may include a question such as "please select a type of merchandise". In response, the user 114 may replay "shirts". The device 102 captures the audio via one or more microphones and sends the captured audio 140 to the first party cloud-based resources 106. Once again, the first party cloud-based resources 106 convert the captured audio 140 into a user response 134. The third party resource management module 120 identifies the stored state information 142 (e.g., for instance, if the user 114 had previously indicated that the user 114 was shopping for men's clothing) as being associated with the user response 134 and sends both the stored state information 142 and the user response 134 to the shopping service 130.

In respond to receiving the stored state information 142 and the user response 134, the shopping service 130 may initiate a second instance of the communication session. In some cases, the shopping service 130 may initiate the second instance based at least in part on the state information 142 received. As part of the second instance, the shopping service 130 may then, in some cases, identify a list of men's shirts that the user 114 may be interested in. For example, the shopping service 130 may generate a list including t-shirts, sport shirts, dress shirts, and pull overs to output to the user 114 as an audio announcement. In another example, the shopping service 130 may, in some cases, identify a list of men's shirts that the user 114 may have an interest in, for example, based on past purchasing information either stored at the third party cloud-based resources 108 or received as part of the stored state information 142. For instance, the shopping service 130 may send a list of dress shirts brands for output as the audio announcement 136, as the shopping service 130 may be aware from the purchasing history that the user 114 has only purchased dress shirts.

Again the third party resource management module 120 receives the text-based announcement 144 and the state information 138 associated with the second instance from the shopping service 130 and stores the state information 138 associated with the second instance and cause the device 102 to output the corresponding audio announcement 136 to the user 114. In this case, the third party resource management module 120 may replace the previously stored state information (e.g., the state information associated with the first instance) and/or append the state information associated with the second instance to the previously stored state information associated with the first instance. The user 114 may respond with a selection of a type of shirt such as red dress shirts, which the third party resource management module 120 relays to the shopping service 130 together with the stored state information 138 (e.g., men's clothing and shirts).

The exchange of state information, captured audio, and audio announcements associated with various instances of the communication session via the third party resource management module 120 may continue until a particular shirt is selected. The shopping service 130 may then cause the third party management module 120 to ask the user 114 to confirm the purchase of a particular shirt as part of an audio announcement 136 and send state information 138 associated with a final instance (including the past information, such as men's clothing, shirt, dress shirt, red shirts, brand, user's neck and sleeve size, etc.) and an identifier for the particular shirt selected for purchase. The user 114 may confirm, for example, by speaking confirm or a particular confirmation phrase. The user 114 may then cause the device to send the confirmation and either payment information, send the confirmation and send payment information stored on the third party cloud-based resources 106, or send the confirmation and instruct the shopping service 130 to utilize payment information stored with the third party cloud-based resources 108 depending on user settings, user account information, the particular third party cloud-based resources 108, among others. Once the shopping service 130 receives the confirmation, the shopping service 130 may complete the transaction and end the communication session.

Figure 2:
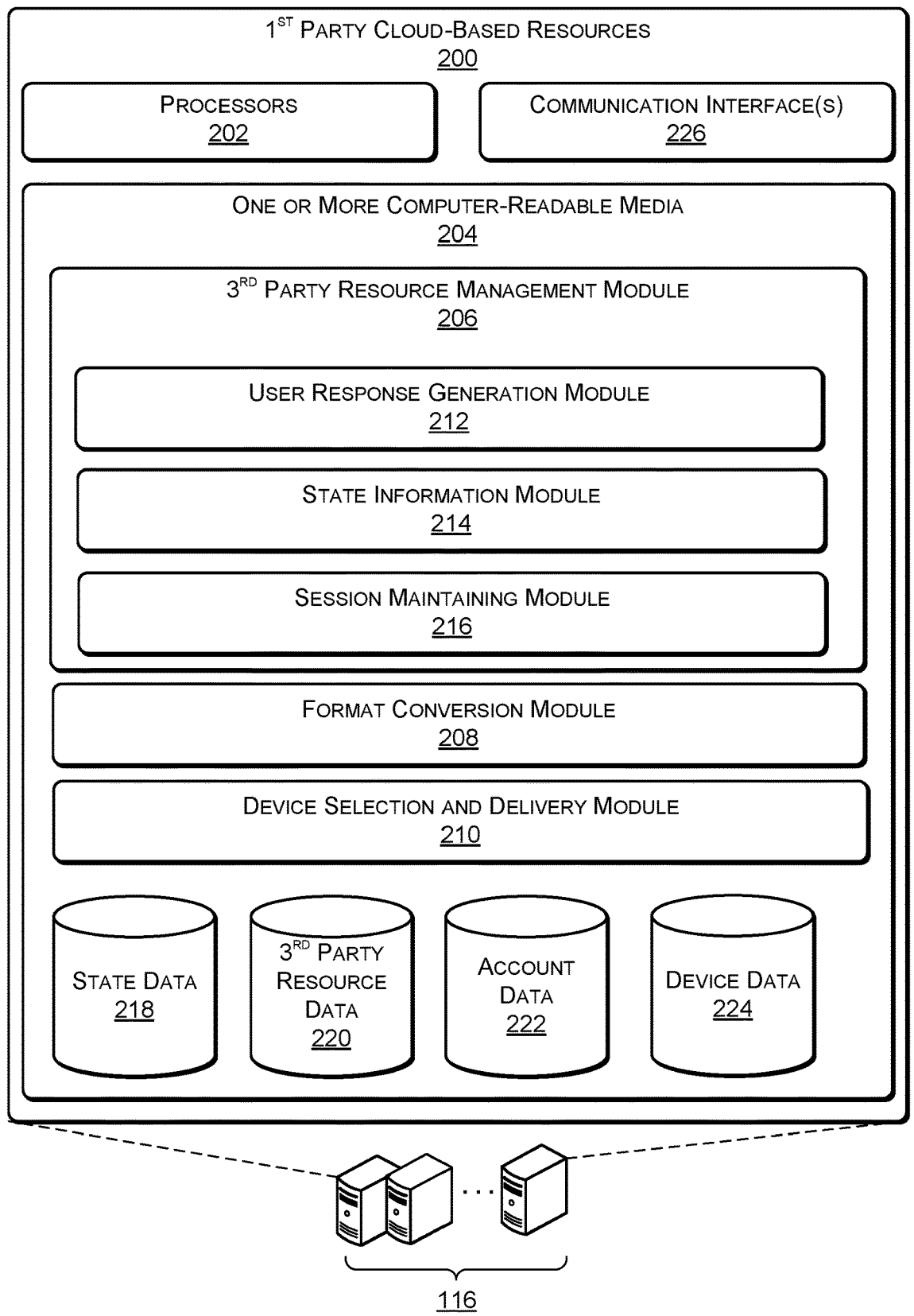
FIG. 2 illustrates an example architecture of one or more servers associated hosting the first party cloud-based resources.

FIG. 2 illustrates an example architecture of one or more servers 116 associated hosting the first party cloud-based resources 200. The first party cloud-based rescues 200 collectively comprise processing resources, as represented by processors 202, and computer-readable storage media 204. The computer-readable storage media 204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may be stored within the computer-readable media 204 and configured to execute on the processors 202. For example, third party resource management modules 206 are sent for routing and connecting devices, such as device 102 of FIG. 1, and third party resources, such as third party resources 108 of FIG. 1. Various other modules may also be stored on computer-readable storage media 204, such as format conversion module 208 for converting text-based announcements into audio announcements that may be output to a user by a device and device selection and delivery module 210 for selecting a particular device associated with the user, the user's home, or the user's account to output the audio announcements. In the current example, the format conversion module 208 is shown as part of the first party cloud-based resources 200 but it should be understood in other examples, the format conversion module 208 may be a protocol or resource called or accessed by the first party cloud-based resources 200.

In some implementations, the third party resource management module 206 may include other modules for routing and connecting user devices with third party resources. For instance, the third party resource management module 206 may include a user response generation module 212 for converting the user response into a package that may be sent to the third party cloud-based resource (e.g., combining the user response with stored state information, converting the captured audio into data processable by the third party cloud-based resources, etc.). In other instance, the third party resource management module 206 may include a state information module 214 for maintaining a mapping or associating of the state information to a particular communication session and a session maintaining module 216 for maintaining a mapping or associating between particular user devices and the particular third party cloud-based resources. For example, the communication session may relate to an entire exchange or a series of interactions between the user and the third party cloud-based resource. In some cases, each interaction may be considered an instance or access between the user and the third party cloud-based resource.

The third party resource management module 206 or the servers 216 may also state data 218, third party resource data 220, account data 222, and device data 224. The state data 218 may include stored state information associated with one or more open access, instances, or sessions between a user device and a third party cloud-based resource.

The third party resource data 220 may include information known about each of third party cloud-based resources available to users of the system described with respect to FIG. 1. For example, the third party resource data 220 may include information related to the usability (e.g., function or specification) or available (e.g., license required, price, etc.).

The account data 222 may include information known about an account associated with the device. For example, the account data 222 may including information known about one or more user's associated with the account, such as profile information, demographic information, user based restrictions, accessible first party and third party cloud-based resources, historical usage or historical data related to user (e.g., shopping history, consumption history, etc.), among others. The account data 222 may include information known about a home, office, or other physical location associated with the account. For instance, the account data 222 may include information related to a number and physical location of each device of a system or a physical relationship (e.g., distance) between particular devices of a system.

The device data 222 may include information known about particular devices associated with a user, an account, or a physical location. For example, the device data 222 may include capabilities and/or specification information associated with individual devices (e.g., display available, audio only, processing capabilities, device restrictions, etc.) associated with a device. In other examples, the device data 222 may include location information related to the relative position of particular devices within a home or office and/or usage information related to particular devices (e.g., time of day, type of service, users, etc.).

The first party cloud-based resources 200 may also include one or more communication interfaces 226 to facilitate communication between the third party cloud-based resources and the end user devices. The communication interfaces 226 may support communication via various networks, such as cellular networks, radio, WiFi networks, the Internet, and so forth. In some cases, the communication interface 226 may support multiple communication protocols for connecting with various different types of networks and/or devices.

In one example, a user of the device may issues a user request to access a particular third party cloud-based resource, such as car rental service, to initiate or open a communication session between the car service and the user. The request is received by the first party cloud-based resources 200 as captured audio and the format conversion module 208 may convert the captured audio into a user request. The user response generation module 212 may combine the user request with any stored state data 218 associated with the access or instance indicated by the session maintaining module 216 into a package for delivery to the third party cloud-based resource indicate by the user.

In turn, third party resource management module 206 may receive an announcement to cause the device to output to the user and state information associated with a first instance to store as state data 218 associated with the communication session. In some implementations, the car rental service or other third party cloud-based resource may close the instance upon providing the announcement and state information. In some cases, the state information may include a counter corresponding to the number of the instances or associated with the communication channel or a unique identifier the car rental service that the session maintaining module 216 may utilize to track the open session. The announcement may be a text based data that may be converted to speech via a format conversion module 208 prior to being transmitted to the user device.

The third party resource management module 206 may cause the communication interface 326 to transmit the audio announcement (e.g., the announcement received from the third party cloud-based resource converted into an audio format) to the device for output as sound to the user and the state information module 214 to store the state information as state data 218 associated with the current instance or access between the user and the car service.

In some examples, the third party resource management module 206 may assign the device to the access such that the third party resource management module 206 continuously sends the audio announcements received from the car service to the device. In other examples, the third party resource management module 206 may assign the home or an account associated with the home to the access such that the third party resource management module 206 sends the audio announcements to one or more devices associated with the home or the home account, for example, based on a known or detected location of the user within the home. For instance, in this example, if the user moves from the living room to the kitchen the third party resource management module 206 may deliver the audio announcement to a second device located in the kitchen rather than the original device in the living room.

In this example, the audio announcement output the device may include a question such as "please select from compact, economy, mid-size, full-size". In response, the user may replay "economy". The device captures the audio via one or more microphones and sends the captured audio to the first party cloud-based resources 200 and the captured audio may be converted to a user response, for instance, via the format conversion module 208.

The state information module 214 may then identify stored state information associated with the first instance of the communication session (e.g., for example, if the user had previously indicated that the user was renting in Austin, Tex.) as being corresponding to the user response and sends both the stored state information (e.g., the location) and the user response (e.g., the car size) to the car service. The exchange of state information, captured audio, and audio announcements via the third party resource management module 206 may continue in this manner until a particular automobile is selected and paid for.

Figure 3:
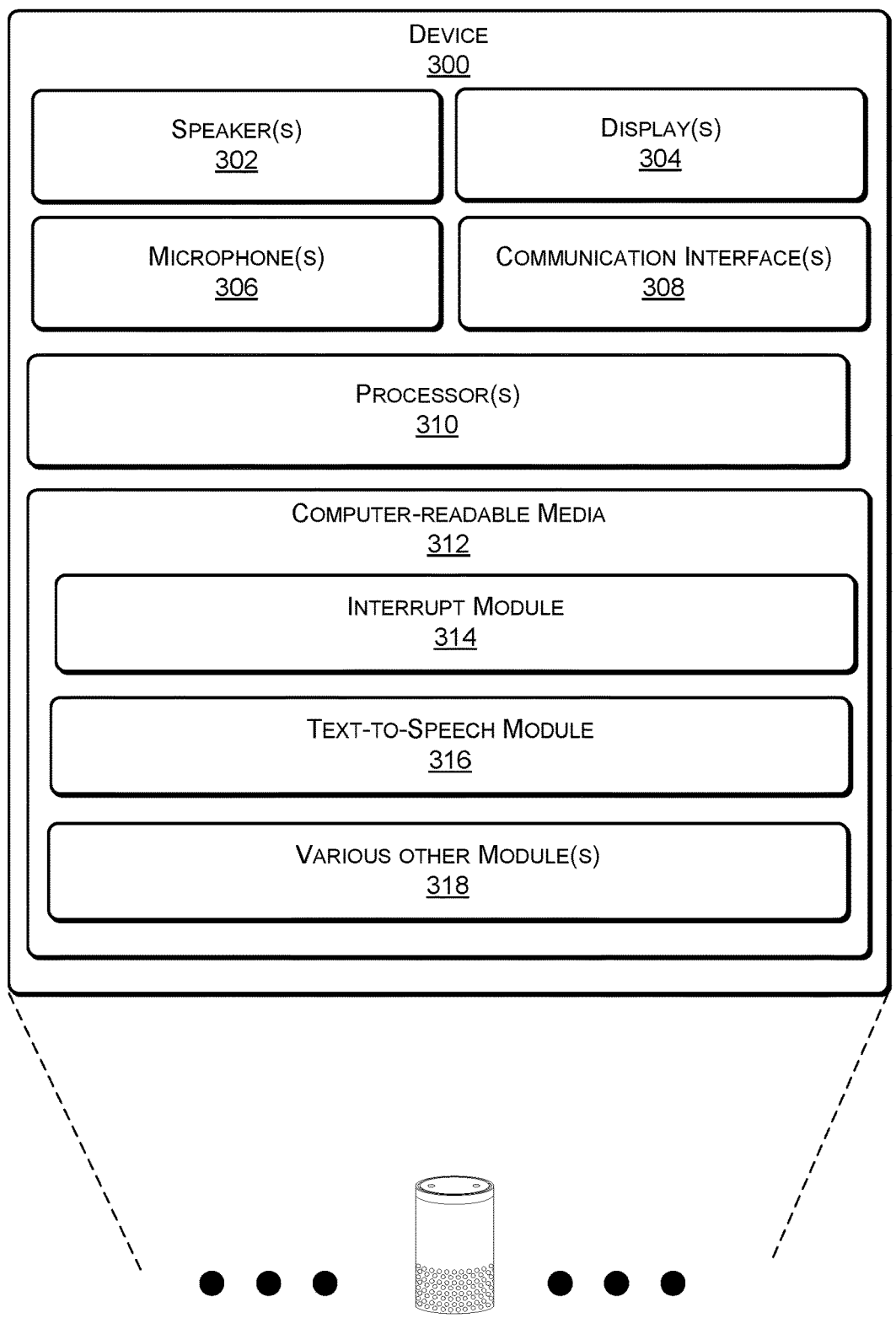
FIG. 3 illustrates an example architecture of a computing device, such as the computing devices in the environment of FIG. 1.

FIG. 3 illustrates an example architecture of a computing device, such as the computing devices in the environment of FIG. 1. Generally, the computing device 300 may be implemented as a standalone device that is relatively simple in terms of functional capabilities with limited input/output components, memory and processing capabilities or as part of a larger electronic system.

The computing device 300 may include one or more speakers 302 and one or more displays 304 to reproduce electronic items for consumption by a user. The computing device 300 may also include one or more microphones 306 to capture sound from an environment and convert the sound into one or more audio signals. The microphones 306 may be a microphone array, a calibrated group of microphones, or multiple microphone arrays or calibrated groups. In some examples, microphones 306 may be incorporated with an analog-to-digital converter to convert the sound into digital microphone output signals for processing.

The computing device 300 also includes one or more communication interfaces 308 to facilitate communication between one or more networks (such as network 110 or 112 of FIG. 1), first party cloud-based resources, and/or third party cloud-based resources. The communication interfaces 308 may also facilitate communication between one or more wireless access points, a master device and/or one or more other computing devices as part of an ad-hoc or home network system. The communication interfaces 308 may support both wired and wireless connection to various networks, such as cellular networks, radio, WiFi networks, short-range or near-field networks (e.g., Bluetooth®), infra-red signals, local area networks, wide area networks, the Internet, and so forth.

The computing device 300 includes, or accesses, components such as at least one control logic circuit, central processing unit, one or more processors 310, in addition to one or more computer-readable media 312 to perform the function of the computing device 300 and or store items. Additionally, each of the processors 310 may itself comprise one or more processors or processing cores.

Depending on the configuration of the computing device 300, the computer-readable media 312 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 310.

Several modules such as instruction, data stores, and so forth may be stored within the computer-readable media 312 and configured to execute on the processors 310. For example, the computer-readable media 312 may store an interrupt module 314, a text-to-speech module 316, and/or various other modules 318 (e.g., speech-to-text modules, operating modules, etc.).

The interrupt module 314 may be configured interrupt a current action, activity, or process being performed by the device 300 in order to deliver an audio announcement from one or more cloud-based resources. For instance, a user may be streaming audio or listing to an audio book via the device 300 when the audio announcement is received at the communication interfaces 308. The interrupt module 314 may determine that the audio announcement is related to an activity or purchase the user has been conducting via the device 300 and cause the streaming audio or audio book to pause, mute, or reduce in volume while outputting the audio announcement to output via the microphones 306.

The text-to-speech module 316 may be configured convert textual and/or visual based audio announcements received from the first party cloud-based resources or the third party cloud-based resources to speech which may be output by the speakers 302. For instance, the device 300 may not be equipped with the displays 304 and one or more of the first party or third party cloud-based resources may be configured to send data to traditional display based devices. In this instance, the device 300 may receive the textual based audio announcement and covert the text into sound that may be output to a user.

For example, the device 300 may receive audio announcements from either first party or third party cloud-based resources and output the audio announcements to the user via the speakers 302. The device 300 may utilize the microphones 306 to capture the user spoken response. In some instances, the device 300 may be configured to detect when a user is speaking and to capture audio during that time. In other instances, the device 300 may be configured to capture audio for a predetermined time period following the output of an audio announcement and/or to continuously capture audio from the surrounding environment.

The device 300 may then transmit the captured audio to the first party cloud-based resources via one or more of the compunction interfaces 308. In some particular implementations, the device 300 may be configured to convert the captured audio into textual content or transcript and to send the textual content to the first party cloud-based resources. The process of receiving audio announcements and capturing user response may be repeated for multiple interactions or messages between the cloud-based resource and the user.

In some cases, each time the audio announcement is received the device 300 may pause, mute, or reduce the volume associated with other operations being performed by the device 300 and/or by other devices in the environment and in communication with the device 300.

FIGS. 4-7 are flow diagrams illustrating example processes for implementing third party cloud-based resources within the system described herein. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 4:
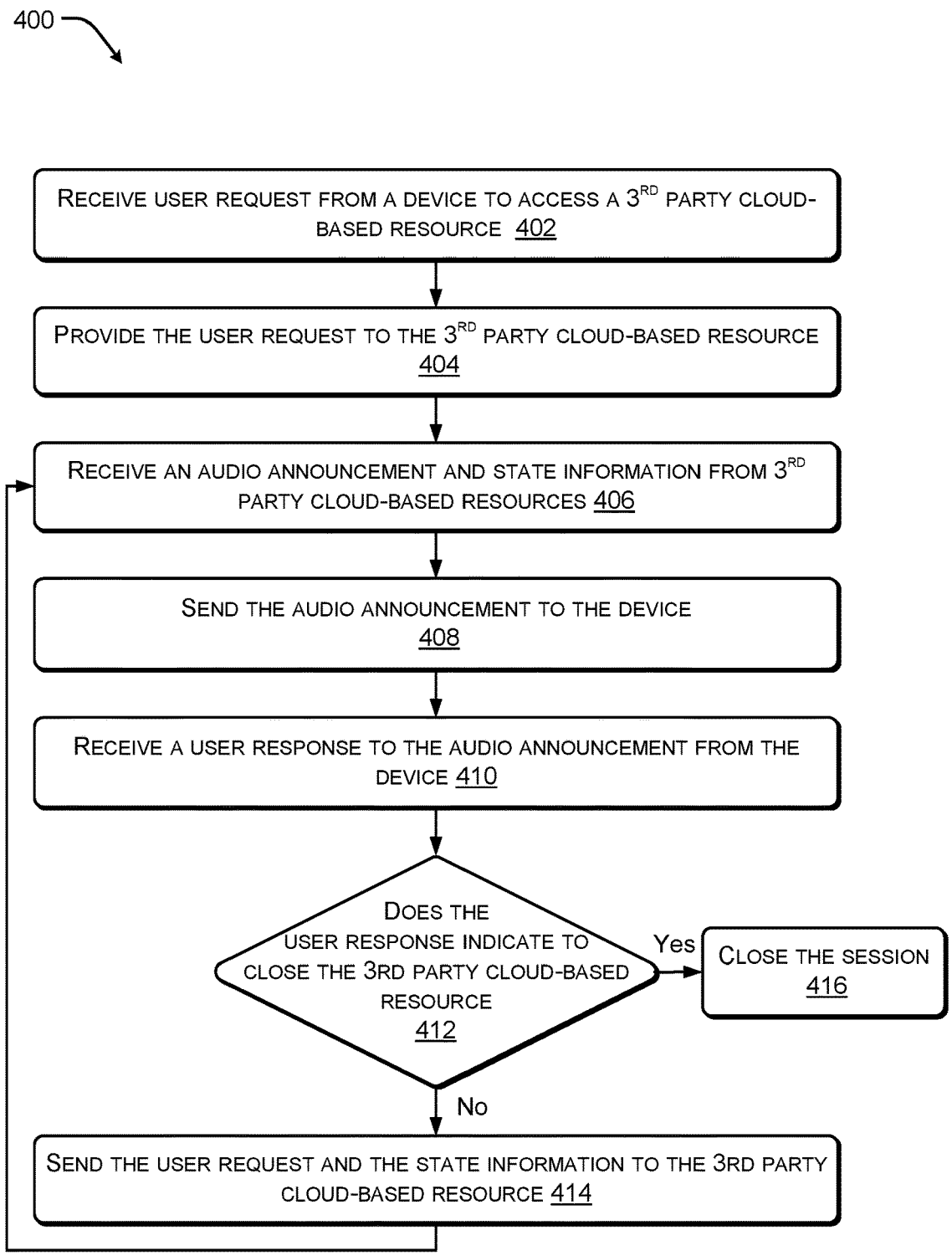
FIG. 4 is an example flow diagram showing an illustrative process to facilitate third party cloud-based resources.

FIG. 4 is an example flow diagram showing an illustrative process 400 to facilitate third party cloud-based resources. For example, a system as illustrated in FIG. 1 may include one or more devices located in a physical environment, such as a home or office, configured to interact with one or more users via audio announcements and user spoken commands or requests. In some cases, the devices may be in communication with first party cloud-based resources. In some examples, the first party cloud-based resources include a third party resource management module for maintaining and facilitating a communication channel or session between a third party cloud-based resources and a user of the devices.

At 402, the third party resources management module receives a user request from a device. The request indicates a third party cloud-based resource that the user desires to interact with. For example, the user may be attempting to access a third party shopping resource or a car rental resource, as described above. In some cases, the user request may cause the third party resources management module to initiate a communication session between the user and the third party cloud-based resource.

At 404, the third party resource management module sends the user request to the third party cloud-based resource to open a session, access, or instance between the user and the third party cloud-based resources. In some cases, the third party resource management or other first party cloud-based resource may receive audio captured by the device and convert the audio into a user request that may be processed by the third party resource management module and/or the requested third party cloud-based resource.

At 406, the third party resource management module receives an audio announcement and state information associated with a first instance of the communication session from the requested third party cloud-based resources in response to sending the user request. In some cases, the state information may include a counter corresponding to the number of the interaction or user accesses associated with the user request or a unique identifier associated with the session or instance. In other cases, the state information may include relevant data that the third party cloud-based resource may utilize to re-open the session. In some particular cases, the state information data is collected as part of previous interactions with the user related to the session or access.

At 408, the third party resource management module sends the audio announcement to the device. In some cases, the audio announcement may be a text based question or information to be presented to the user. The third party resource management module or another of the first party cloud-based resources may convert the text into audio that may be output to the user via the device.

At 410, the third party resource management module receives a user response to the audio announcement from the device. For example, the audio announcement may be a request for additional information necessary to complete a transaction, such as payment information. In this example, the user response may be the necessary payment information to complete a purchase.

At 412, the third party resource management module determines if the user response indicates to close the third party cloud-based resource. For example, the user may have requested to cancel any transaction or stop consumption of electronic media, which the third party resource management module interprets as a request to close the third party cloud-based resource. In other example, the device may send an indication to close the third party cloud-based resource after a threshold amount of time has elapsed with no user interaction. In some specific example, the third party resource management module may decide to close the third party cloud-based resource after a threshold period of inactivity from the device. In some cases, the third party resource management module may, however, maintain the state information after the threshold period has elapsed, such that the user may pick up the session where the user left off at a later time.

If the third party resource management module determines the user request indicates to close the third party cloud-based resource, the process 400 proceeds to 416 and the communication session is closed. In some cases, the session may be closed by deleting the stored state information or by not sending any additional user response to the third party cloud-based resources, as the system is designed to allow the third party cloud-based resource to consider each user request as an individual session or access (e.g., the third party cloud-based resource has already closed the session and only re-opens the session when a user response and corresponding state information is received). In other cases, the third party resource management module may send a message to the third party cloud-based resource to cause the third party cloud-based resource to close.

If, however, the third party resource management module determines the user request should be sent to the third party cloud-based resource, the process 400 proceeds to 414 and the third party resource management module sends the user request and any corresponding stored state information to the third party cloud-based resource for handling by the third party cloud-based resource and the process 400 returns to 406.

Figure 5:
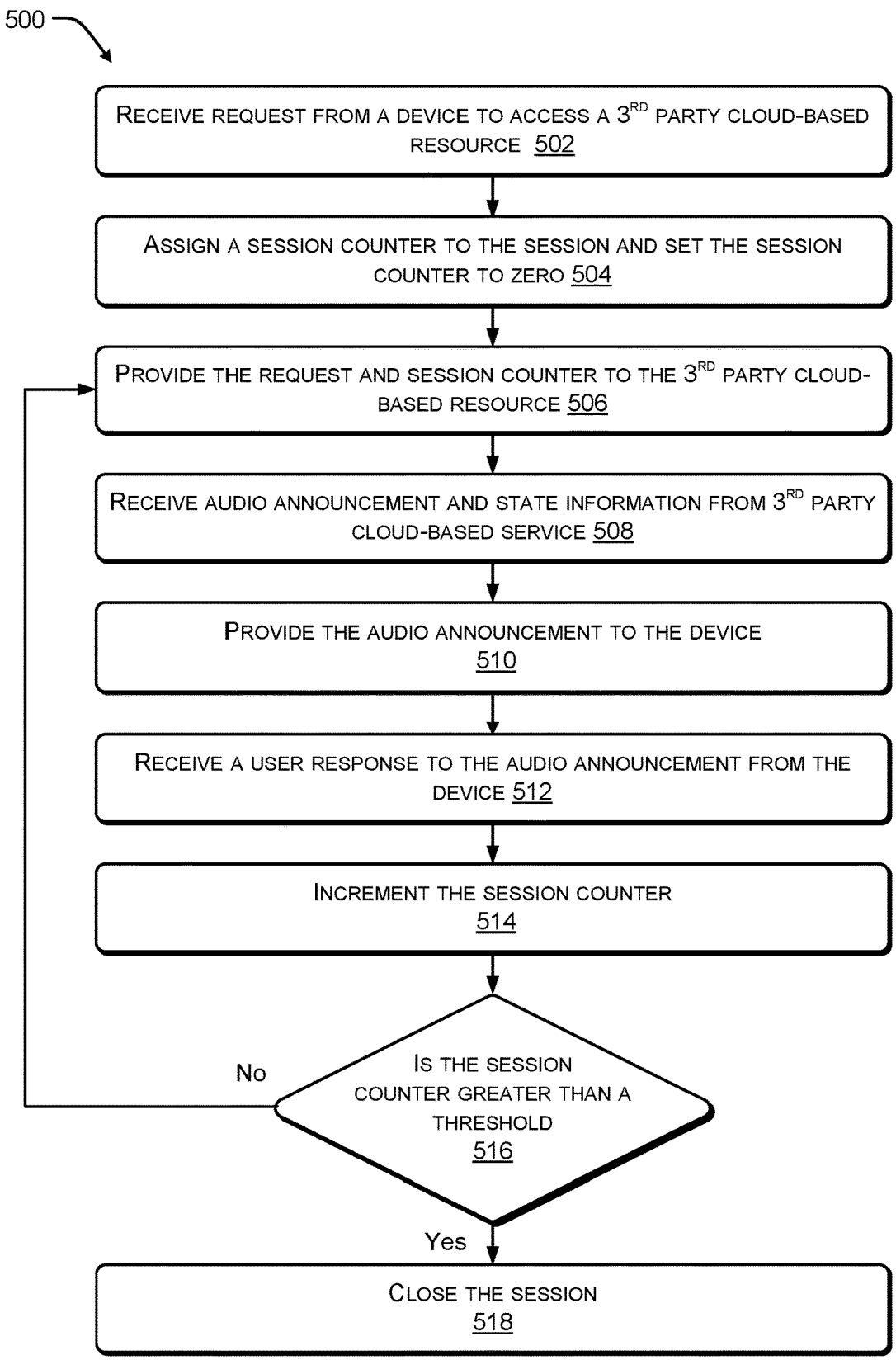
FIG. 5 is another example flow diagram showing an illustrative process to facilitate third party cloud-based resources.

FIG. 5 is another example flow diagram showing an illustrative process 500 to facilitate third party cloud-based resources. For example, a system as illustrated in FIG. 1 may include one or more devices located in a physical environment, such as a home or office, configured to interact with one or more users via audio announcements and user spoken commands or requests. In some cases, the devices may be in communication with first party cloud-based resources. In some examples, the first party cloud-based resources include a third party resource management module for maintaining and facilitating a communication channel or session between a third party cloud-based resources and a user of the devices.

At 502, the third party resources management module receives a user request from a device. The request indicates a third party cloud-based resource that the user desires to interact with. For example, the user may be attempting to access a third party shopping resource or a car rental resource, as described above. In some cases, the user request may cause the third party resources management module to initiate a communication session between the user and the third party cloud-based resource.

At 504, the third party resource management module assigns a session counter to the access and set the session counter to zero. In some cases, the session counter may be utilized by the third party resource management module to track state information and/or to maintain the session or access between the third party cloud-based resource and the user or user device. In some examples, the session counter may be utilized do close the communication session or access and/or to limit the total number of interactions between a user and the third party cloud-based resources associated with a single session or access.

At 506, the third party resource management module sends the user request and the session counter to the third party cloud-based resource to open a session, access, or instance between the user and the third party cloud-based resources. In some cases, the third party resource management or other first party cloud-based resource may receive audio captured by the device and convert the audio into a user request that may be processed by the third party resource management module and/or the requested third party cloud-based resource.

At 508, the third party resource management module receives an audio announcement and state information from the requested third party cloud-based resources in response to sending the user request. In some cases, the state information may include the session counter or a unique identifier associated with the session or instance. In other cases, the state information may include other relevant data that the third party cloud-based resource may utilize to re-open the session. In some particular cases, the state information data collected as party of previous interactions with the user related to the session or access.

At 510, the third party resource management module sends the audio announcement to the device. In some cases, the audio announcement may be a text based question or information to present to the user. The third party resource management module or another of the first party cloud-based resources may convert the text into audio that may be output to the user via the device.

At 512, the third party resource management module receives a user response to the audio announcement form the device. For example, the audio announcement may be a request for additional information necessary to complete a transaction, such as payment information. In this example, the user response may be the necessary payment information to complete a purchase.

At 514, the third party resource management module increment the session counter, and at 516 the third party resource management module determines if the session counter is greater than a threshold. For example, the third party resource management module may maintain the session counter to ensure each transaction between the user and the third party cloud-based rescues are preserved as separate transactions, as well as to ensure the total size of the data associated with the state information is maintained below a maximum threshold. For example, to ensure an acceptable response time and/or reduce overall lag or wait time experienced by a user, the third party resource management module may attempt to reduce or maintain the data transfer below a maximum threshold to thereby reduce the time associated with network data transfers resulting from inserting the third party resource management module into the communication channel.

If the third party resource management module determines the session counter is greater than the threshold, the process 500 proceeds to 518 and the communication session is closed. In some cases, the communication session may be closed by deleting the stored state information or by not sending any additional user response to the third party cloud-based resources, as the system is designed to allow the third party cloud-based resource to consider each user request as an of a communication session (e.g., the third party cloud-based resource has already closed the communication session and only re-opens the session when a user response and corresponding state information is received). In other cases, the third party resource management module may send a message to the third party cloud-based resource to cause the third party cloud-based resource to close.

If, however, the third party resource management module determines the session counter is less than the threshold, the process 500 returns to 506 and additional interactions are conducted between the user and the third party cloud-based resource.

Figure 6:
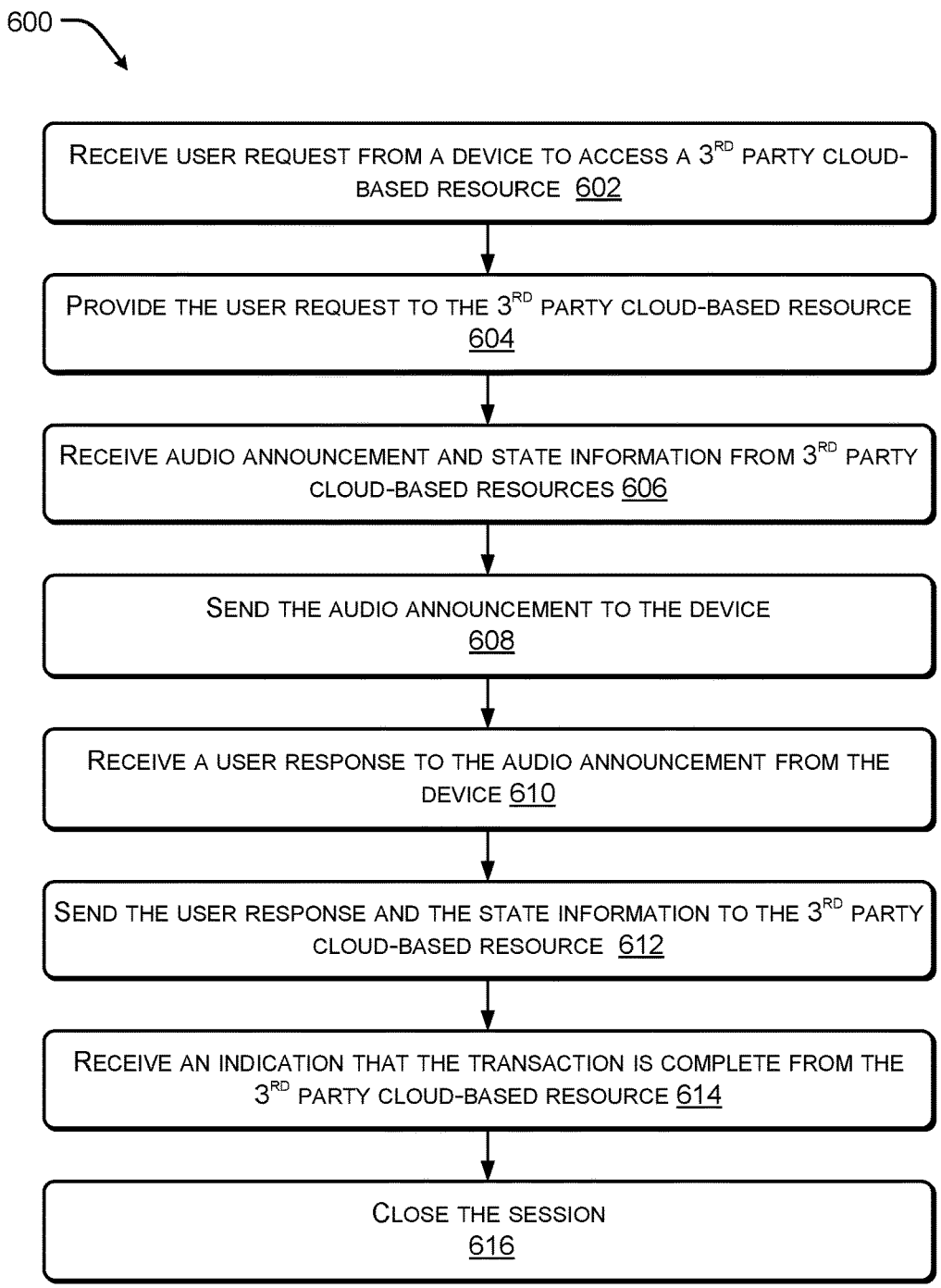
FIG. 6 is another example flow diagram showing an illustrative process to facilitate third party cloud-based resources.

FIG. 6 is another example flow diagram showing an illustrative process 600 to facilitate third party cloud-based resources. For example, a system as illustrated in FIG. 1 may include one or more devices located in a physical environment, such as a home or office, configured to interact with one or more users via audio announcements and user spoken commands or requests. In some cases, the devices may be in communication with first party cloud-based resources. In some examples, the first party cloud-based resources include a third party resource management module for maintaining and facilitating a communication channel or session between a third party cloud-based resources and a user of the devices.

At 602, the third party resources management module receives a user request from a device. The request indicates a third party cloud-based resource that the user desires to interact with. For example, the user may be attempting to access a third party shopping resource or a car rental resource, as described above. In some cases, the user request may cause the third party resources management module to initiate a communication session between the user and the third party cloud-based resource.

At 604, the third party resource management module sends the user request to the third party cloud-based resource to open a communication session between the user and the third party cloud-based resources. In some cases, the third party resource management or other first party cloud-based resource may receive audio captured by the device and convert the audio into a user request that may be processed by the third party resource management module and/or the requested third party cloud-based resource.

At 606, the third party resource management module receives an audio announcement and state information associated with an instance of the communication session from the requested third party cloud-based resources in response to sending the user request. In some cases, the state information may include a counter corresponding to the number of the interaction or user accesses associated with the user request or a unique identifier associated with the session or instance. In other cases, the state information may include relevant data that the third party cloud-based resource may utilize to re-open the session. In some particular cases, the state information data is collected as part of previous interactions with the user related to the session or access.

At 608, the third party resource management module sends the audio announcement to the device. In some cases, the audio announcement may be a text based question or information to be presented to the user. The third party resource management module or another of the first party cloud-based resources may convert the text into audio that may be output to the user via the device.

At 610, the third party resource management module receives a user response to the audio announcement from the device. For example, the audio announcement may be a request for additional information necessary to complete a transaction, such as payment information. In this example, the user response may be the necessary payment information to complete a purchase.

At 612, the third party resource management module sends the user response and the stored state information to the third party cloud-based resource. In some cases, the third party resource management or other first party cloud-based resource may receive audio captured by the device and convert the audio into a user response that may be processed by the third party resource management module and/or the requested third party cloud-based resource.

At 614, the third party resource management module receives an indication that the transaction is complete from the third party cloud-based resource. For example, the third party cloud-based resource may have obtained enough information to process the user request and, therefore the session may close. Thus, at 616, the third party resource management module closes the session in response to the indication form the third party cloud-based resource.

Figure 7:
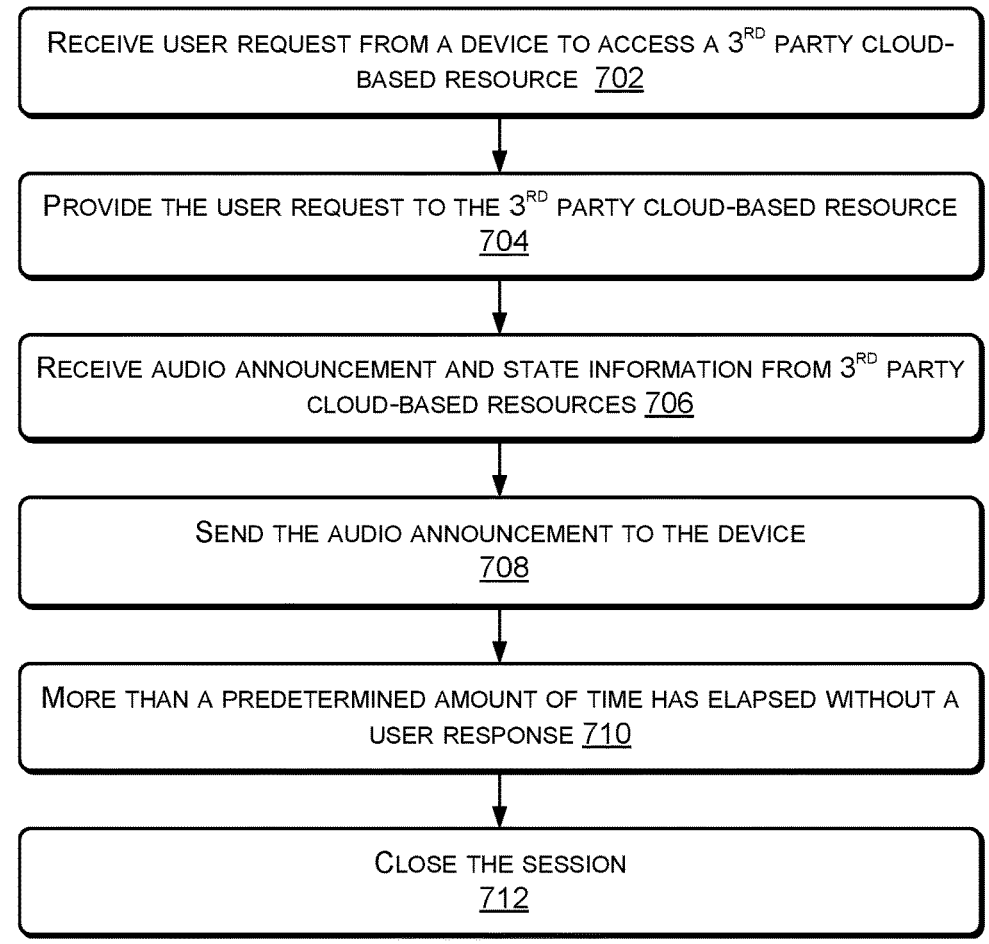
FIG. 7 is another example flow diagram showing an illustrative process to facilitate third party cloud-based resources.

FIG. 7 is another example flow diagram showing an illustrative process 700 to facilitate third party cloud-based resources. For example, a system as illustrated in FIG. 1 may include one or more devices located in a physical environment, such as a home or office, configured to interact with one or more users via audio announcements and user spoken commands or requests. In some cases, the devices may be in communication with first party cloud-based resources. In some examples, the first party cloud-based resources include a third party resource management module for maintaining and facilitating a communication channel or session between a third party cloud-based resources and a user of the devices.

At 702, the third party resources management module receives a user request from a device. The request indicates a third party cloud-based resource that the user desires to interact with. For example, the user may be attempting to access a third party shopping resource or a car rental resource, as described above. In some cases, the user request may cause the third party resources management module to initiate a communication session between the user and the third party cloud-based resource.

At 704, the third party resource management module sends the user request to the third party cloud-based resource to open a communication session between the user and the third party cloud-based resources. In some cases, the third party resource management or other first party cloud-based resource may receive audio captured by the device and convert the audio into a user request that may be processed by the third party resource management module and/or the requested third party cloud-based resource.

At 706, the third party resource management module receives an audio announcement and state information associated with an instance of the communion session from the requested third party cloud-based resources in response to sending the user request. In some cases, the state information may include a counter corresponding to the number of the interaction or user accesses associated with the user request or a unique identifier associated with the session or instance. In other cases, the state information may include relevant data that the third party cloud-based resource may utilize to re-open the session. In some particular cases, the state information data is collected as part of previous interactions with the user related to the session or access.

At 708, the third party resource management module sends the audio announcement to the device. In some cases, the audio announcement may be a text based question or information to be presented to the user. The third party resource management module or another of the first party cloud-based resources may convert the text into audio that may be output to the user via the device.

At 710, the third party resource management module determines if more than a predetermined amount of time has elapsed without a user response. For example, the third party resource management module may be configured to close idle sessions and thus a predetermined period of time may be set for receiving user responses. In this case, the user has not responded within the predetermined period of time so the process 700 proceeds to 712 and the third party resource management module closes the session in response to the indication form the third party cloud-based resource.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors; and
one or more computer-readable storage media storing computer-executable instructions that, when executed by the one or more processors, cause the one or more processors to:
  receive first content data including a user request;
  establish a communication session between the system and at least one network-accessible resource, wherein the at least one network-accessible resource is remote from the system;
  send the first content data to the at least one network-accessible resource;
  receive, from the at least one network-accessible resource and at least partly in response to sending the first content data, second content data and first information, the first information associating the user request with the communication session, wherein the first information is based at least in part on a previous response from the at least one network-accessible resource;
  store the first information; and
  cause the second content data to be outputted by an audio speaker.

2. The system of claim 1, wherein the first content data comprises a first audio input and the computer-executable instructions, when executed by the one or more processors, further cause the one or more processors to:
  receive a second audio input; and
  close the communication session based at least partly on the second audio input.

3. The system of claim 1, wherein the second content data comprises a response to the first content data, the response generated by a third-party network resource.

4. The system of claim 1, further comprising receiving the first content data via a device with a microphone.

5. The system of claim 1, wherein the at least one network-accessible resource comprises a network resource provided by a provider of a device that includes the audio speaker.

6. The system of claim 1, further comprising:
converting second audio input into third text data;
generating second information based on the first information and the third text data; and
sending the third text data and the second information to the at least one network-accessible resource.

7. A method comprising:
receiving first content data including a user request;
establishing a communication session between a device and at least one network-accessible resource, wherein the at least one network-accessible resource is remote from the device;
sending the first content data to the at least one network-accessible resource via a first communication channel;
receiving second content data and first information from the at least one network-accessible resource via a second communication channel, the first information associating the user request with the communication session, wherein the first information is based at least in part on a previous response from the at least one network-accessible resource;
storing the first information; and
causing the second content data to be outputted by an audio speaker.

8. The method of claim 7, wherein the first content data comprises a first audio input and further comprising:
receiving a second audio input; and
closing the communication session based at least partly on the second audio input.

9. The method of claim 7, wherein the second content data comprises a response to the first content data, the response being generated by a third-party network resource.

10. The method of claim 9, further comprising receiving information associated with the user request, and wherein converting the first content data into the first content data is based at least partly on the information.

11. The method of claim 7, further comprising receiving the first content data via a device with a microphone.

12. The method of claim 7, wherein the at least one network-accessible resource comprises a network resource provided by a provider of a device that includes the audio speaker.

13. The method of claim 7, further comprising:
converting second audio input into third text data;
generating second information based on the first information and the third text data; and
sending the third text data and the second information to the at least one network-accessible resource.

14. A device comprising:
a microphone;
an audio speaker;
one or more processors; and
computer-readable storage media storing computer-executable instructions that, when executed by the one or more processors, cause the one or more processors to:
receive, via the microphone, first content data including a user request;
establish a communication session between the device and at least one network-accessible resource, wherein the at least one network-accessible resource is remote from the device;
send the first content data to the at least one network-accessible resource;
receive, from the at least one network-accessible resource, second content data representing a response to the user request;
receive, from the at least one network-accessible resource, a first information, the first information associating the user request with the communication session, wherein the first information is based at least in part on at least one of a previous user request or a previous response from the at least one network-accessible resource;
store the first information; and
cause the first content data to be outputted by the audio speaker.

15. The device of claim 14, wherein the first content data comprises a first audio input and the computer-executable instructions, when executed by the one or more processors, further cause the one or more processors to:
receive, via the microphone, a second audio input; and
close the communication session based at least partly on the second audio input.

16. The device of claim 14, wherein the second content data comprises a response to the first content data, the response generated by a third-party network resource.

17. The device of claim 14, wherein the at least one network-accessible resource comprises a network resource provided by a provider of the device.

18. The device of claim 17, wherein the device comprises a first home electronic device that communicates with a second home electronic device.

19. The device of claim 14, wherein the computer-executable instructions, when executed by the one or more processors, further cause the one or more processors to:
perform an operation; and
pause the operation, mute a volume of the operation, or reduce the volume of the operation based at least partly on receiving the first content data.

20. The device of claim 14, further comprising:
converting second audio input into third text data;
generating second information based on the first information and the third text data; and
sending the third text data and the second information to the at least one network-accessible resource.

* * * * *